United States Patent
Shibasaki (10) Patent No.: US 10,835,930 B2
(45) Date of Patent: Nov. 17, 2020

(54) SORTING SYSTEM

(71) Applicant: FANUC Corporation, Yamanashi (JP)

(72) Inventor: Yasuhiro Shibasaki, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 16/161,074

(22) Filed: Oct. 16, 2018

(65) Prior Publication Data

US 2019/0118226 A1    Apr. 25, 2019

(30) Foreign Application Priority Data

Oct. 23, 2017    (JP) ................. 2017-204417

(51) Int. Cl.
| | |
|---|---|
| *B07C 5/36* | (2006.01) |
| *B07C 7/00* | (2006.01) |
| *G05B 13/02* | (2006.01) |

(52) U.S. Cl.
CPC .............. *B07C 5/361* (2013.01); *B07C 7/005* (2013.01); *G05B 13/0265* (2013.01)

(58) Field of Classification Search
CPC ................................ B25J 9/163; G06N 20/00
See application file for complete search history.

(56) References Cited

U.S. PATENT DOCUMENTS

| | | | | |
|---|---|---|---|---|
| 5,659,624 | A  * | 8/1997 | Fazzari | ................. B07C 5/3422 209/580 |
| 8,296,257 | B1 * | 10/2012 | Chavira | .................. G06F 16/93 706/62 |
| 2019/0061151 | A1 * | 2/2019 | Namiki | .................... B25J 9/163 |
| 2019/0311287 | A1 * | 10/2019 | Chew | ....................... G06N 7/00 |

FOREIGN PATENT DOCUMENTS

| | | |
|---|---|---|
| JP | 2011-158373 A | 8/2011 |
| JP | 2014-24048 A | 2/2014 |
| JP | 2015-137919 A | 7/2015 |
| JP | 2017-109197 A | 6/2017 |

OTHER PUBLICATIONS

Notice of Allowance in JP Application No. 2017-204417, dated Aug. 27, 2019, 3pp.

* cited by examiner

*Primary Examiner* — Timothy R Waggoner
(74) *Attorney, Agent, or Firm* — Hauptman Ham, LLP (57) ABSTRACT

A sorting system determines the aptitude of the result of learning obtained by learning sorting data indicative of the result of sorting of an object to be sorted corresponding to measurement data on a state of the object to be sorted. If the aptitude is compatible with a previously specified criterion, the operation of the system is switched so as to perform automatic sorting of the object to be sorted. If the aptitude is not compatible with the previously specified criterion, the operation of the system is switched so as not to perform the automatic sorting of the object to be sorted.

5 Claims, 6 Drawing Sheets

SORTING SYSTEM

RELATED APPLICATIONS

The present application claims priority of Japanese Application Number 2017-204417, filed on Oct. 23, 2017, the disclosure of which is hereby incorporated by reference herein in its entirety.

BACKGROUND OF THE INVENTION

Field of the Invention

The present invention relates to a sorting system, and more particularly, to a sorting system capable of sequentially reducing man-hours in a sorting process by machine learning.

Description of the Related Art

There is a demand for the automation of sorting (e.g., classification between non-defective and defective) of workpieces (or products) based on human visual perception. To meet this demand, a sorting system has been developed in which images of the workpieces and physical quantities such as weights are measured for the workpiece sorting and non-defective/defective determination is performed based on the result of the measurement.

In an art disclosed in Japanese Patent Applications Laid-Open No. 2011-158373 as a prior art example related to workpiece sorting, teacher data for automatically classifying defects of a substrate is created by calculating the feature quantity of collected defective image data and sequentially settling the classification by using a Euclidean distance from a teacher image.

Moreover, Japanese Patent Application Laid-Open No. 2015-137919 discloses an art in which the accuracies of defect classification and quality determination are improved with use of a device as a worker is urged to input the quality of an imaged defect candidate and thresholds for classification are updated based on the feature quantity of the defect candidate if the quality of the defect candidate is undetermined.

A learner should first be created in order to use machine learning as a workpiece sorting method, as described in the above prior arts. To create the learner in the present circumferences, it is necessary to accumulate a large amount of physical information such as images and weights for each sorting category and perform annotation (instruction of categories to which workpieces belong), thereby preparing learning data.

Figure 7:
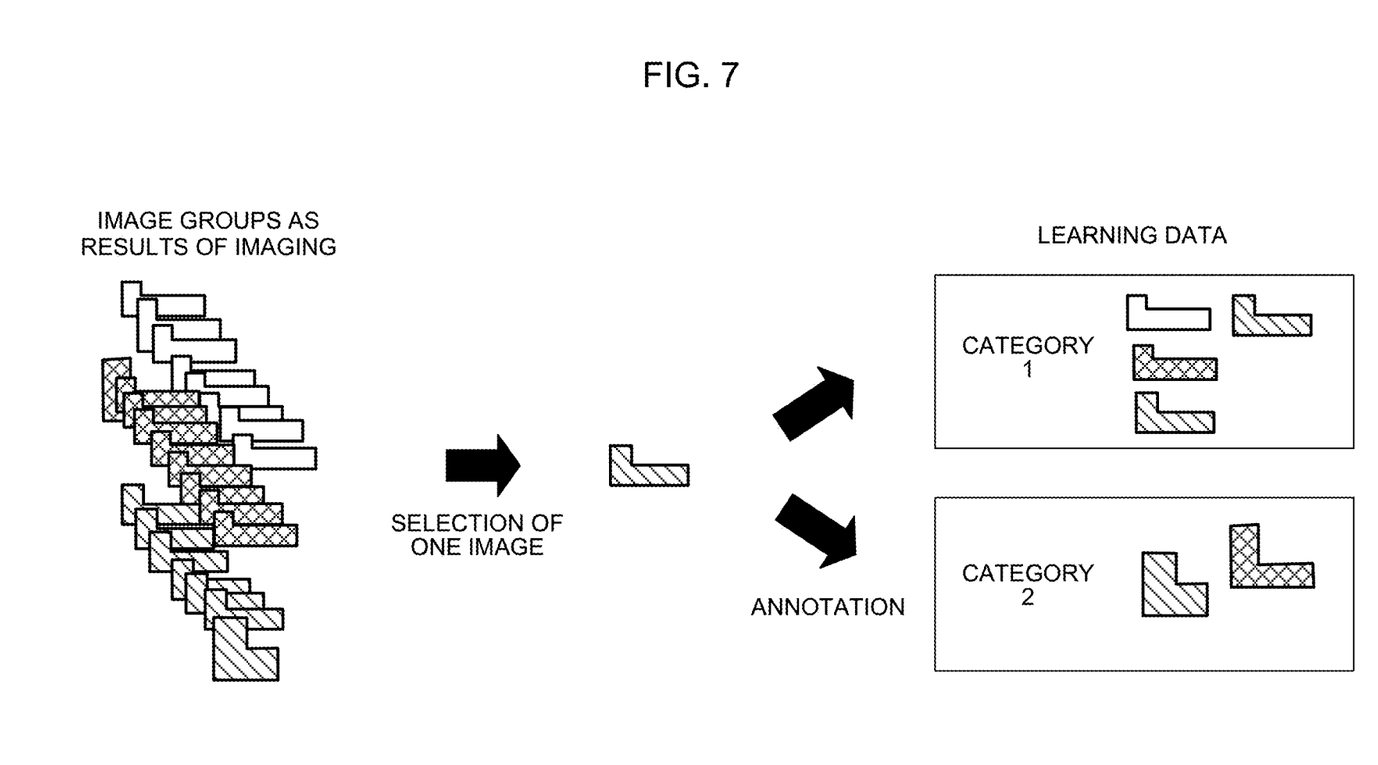
FIG. 7 is a conceptual diagram of learning data creation.

FIG. 7 shows a conceptual diagram of the learning data creation. In order to perform such learning as to be able to accurately sort the workpieces into factors or created categories shown in FIG. 7, a considerable amount of samples should be prepared for each category and the actual execution of automatic sorting has a big hurdle. Accordingly, there is a problem that it is difficult to use the machine learning at the sorting site.

To solve this problem, according to the arts disclosed in Japanese Patent Applications Laid-Open Nos. 2011-158373 and 2015-137919, the worker's visual inspection is incorporated in an automatic sorting process and the result of its evaluation is expected to be relearned. In the arts disclosed in these publications, results in the learner are used starting from an initial process of sorting and the accuracy of the result of classification is visually confirmed. In this method, a large number of workpieces that are wrongly sorted in the initial process or the like in which the accuracy of the learner is insufficient is returned for resorting, so that the sorting process cannot be efficiently advanced.

SUMMARY OF THE INVENTION

Accordingly, the object of the present invention is to provide a sorting system for efficiently and accurately implementing automatic sorting work.

A sorting system according to the present invention acquires the result of manual classification by a worker, based on an input image of an object to be sorted and physical information such as weights, associates the classification result with the input image and the physical information, advances machine learning in parallel with the worker's manual work using the associated pieces of information on the classification result and the input image and the physical information, performs temporary classification as required using the result of the learning, and compares the result of the temporary classification with the result of the worker's manual classification. Based on the result of the comparison, the worker is notified of an end of the manual work when a predetermined threshold is exceeded by the rate of concordance between the result of the worker's manual classification and the result of classification by a machine learning device or the frequency of continuous match, and thereafter, automatic sorting is performed by the machine learning device.

A sorting system according to the present invention is configured to generate control information for sorting an object to be sorted, based on measurement data obtained by measuring a state of the object to be sorted with a measuring device, and comprises an input device configured to input sorting data indicative of the result of sorting of the object to be sorted by a worker, a machine learning device configured to learn the sorting data corresponding to the measurement data, a learning result aptitude determination unit configured to determine the aptitude of the result of learning by the machine learning device, based on the result of sorting of the object to be sorted input through the input device and the result of sorting of the object to be sorted determined by using the learning result of the machine learning device, a sorting control switching unit configured to switch the mode of sorting operation for the object to be sorted, based on the result of the determination by the learning result aptitude determination unit, and a control unit configured to generate control information for sorting the object to be sorted. The sorting control switching unit switches the operation of the control unit so as to perform automatic sorting of the object to be sorted if the aptitude of the result of the learning by the machine learning device is compatible with a previously specified criterion, and switches the operation of the control unit so as not to perform the automatic sorting of the object to be sorted if the aptitude of the learning result of the machine learning device is not compatible with the previously specified criterion.

The learning result aptitude determination unit may further determine that the aptitude of the learning result of the machine learning device is compatible with the previously specified criterion if the result of statistical processing based on the result of sorting of the object to be sorted input through the input device and the learning result of the machine learning device is not lower than a predetermined first criterion.

The learning result aptitude determination unit may further command the machine learning device to stop the learning if the result of statistical processing based on the result of sorting of the object to be sorted input through the input device and the learning result of the machine learning device is not lower than a predetermined third criterion.

The learning result aptitude determination unit may further command the machine learning device to discard the learning result obtained so far and start over the learning anew if the result of statistical processing based on the result of sorting of the object to be sorted input through the input device and the learning result of the machine learning device is not higher than a predetermined fifth criterion.

The machine learning device may be able to further observe sorting-related information for supplementing the sorting of the object to be sorted in addition to the measurement data and may learn the sorting data corresponding to both the measurement data and the sorting-related information.

According to the present invention arranged in this manner, a sorting process can be automated to reduce man-hours in manual sorting, without reducing the speed and accuracy of the sorting, by performing the manual sorting in the initial stage and advancing model learning based on the result of the sorting as production is carried out.

BRIEF DESCRIPTION OF THE DRAWINGS

The above and other objects and features of the present invention will become apparent from the ensuing description of embodiments with reference to the accompanying drawings, in which.

DETAILED DESCRIPTION OF THE PREFERRED EMBODIMENTS

The following is a description of an embodiment of a sorting system for implementing the present invention.

Figure 1:
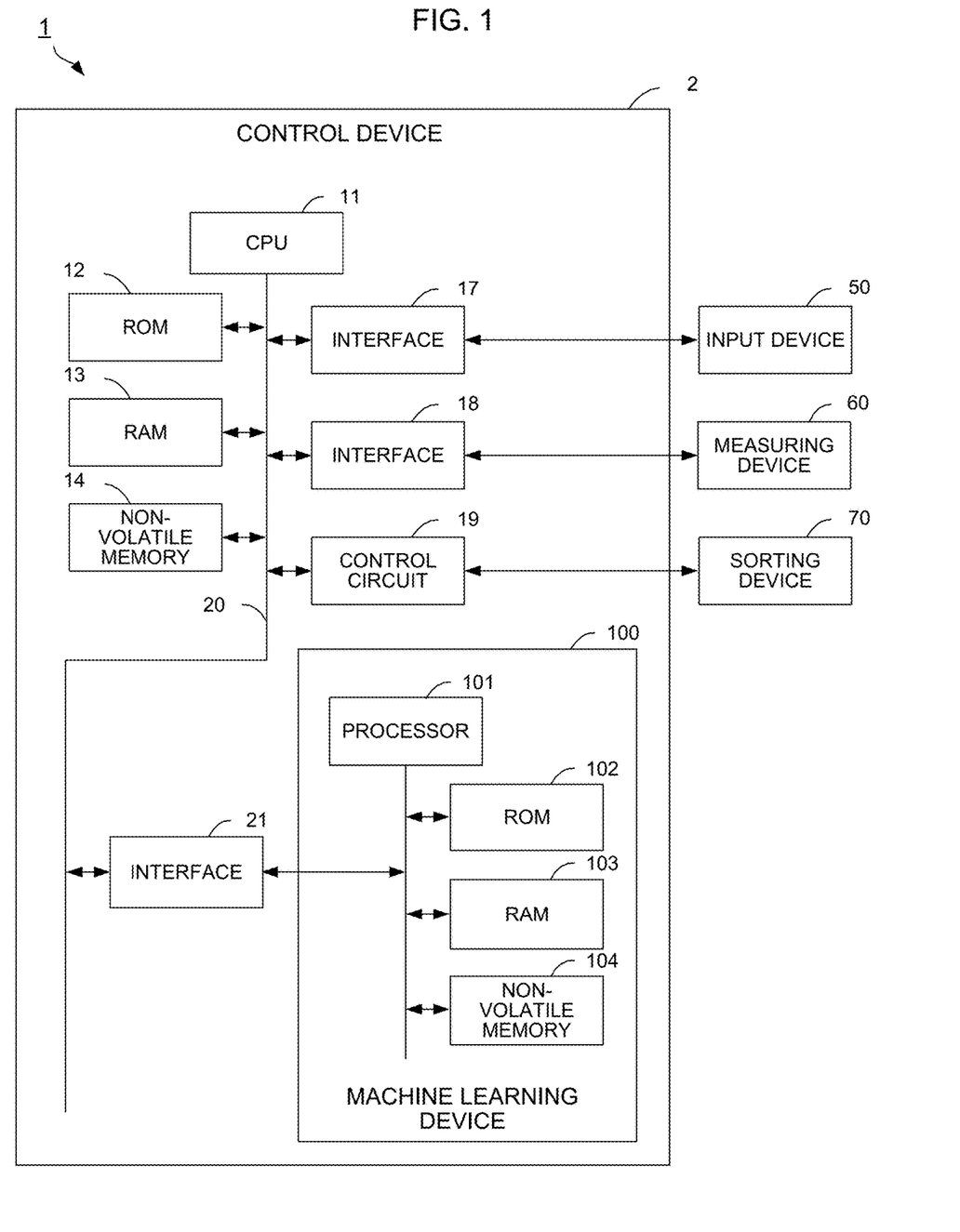
FIG. 1 is a schematic hardware configuration diagram showing principal parts of a sorting system according to one embodiment.

FIG. 1 is a schematic hardware configuration diagram showing principal parts of a sorting system according to a first embodiment. A sorting system 1 of the present embodiment comprises at least an input device 50, a measuring device 60, a sorting device 70, a control device 2, and a machine learning device 100. The input device 50 is used to input the result of sorting of objects to be sorted, such as fruit and vegetables or other irregular-shaped objects and machined workpieces, by a worker. The measuring device 60 acquires images or other physical quantities, such as the weights, rigidities, sizes or temperatures, of the objects to be sorted. The sorting device 70 serves to sort the objects. The control device 2 controls the sorting device 70.

The sorting device 70 may be in any form, provided it is configured, like a device for sorting the objects to be sorted flowing on, for example, a conveyor at its junction or a robot that holds and sorts the objects to be sorted on a conveyor, processing machine, or platform, to sort the objects to be sorted. The control device 2 is provided with a necessary structure for controlling this sorting device 70 so as to sort the objects to be sorted based on predetermined classification.

A CPU (Central Processing Unit) 11 of the control device 2 according to the present embodiment is a processor for generally controlling the control device 2. The CPU 11 reads out a system program stored in a ROM (Read-Only Memory) 12 through a bus 20 and controls the entire control device 2 according to this system program. A RAM (Random Access Memory) 13 is temporarily stored with various data, such as temporary calculation data, sorting result data on the objects to be sorted input by the worker through the input device 50 (or input automatically), and measurement data on the objects to be sorted measured by the measuring device 60.

A non-volatile memory 14 is constructed as a memory that is, for example, backed up by a battery (not shown) so that its storage state can be maintained even when the control device 2 is turned off. The non-volatile memory 14 is stored with preset setting data on the sorting device 70, control programs which are input through an interface (not shown) and so on. The programs and various data stored in the non-volatile memory 14 may be expanded in the RAM 13 at the time of execution or use. Moreover, system programs are previously written in the ROM 12. These system programs include publicly-known analysis programs for analyzing the measurement data measured by the measuring device 60 and system programs for controlling exchange with the machine learning device 100 (described later).

The input device 50 is a device for inputting the result of sorting of the objects to be sorted. The sorting result of the objects to be sorted input by the input device 50 may be the result of sorting into two categories, e.g., sorting of the objects into defective and non-defective products, or the result of sorting of the objects into three or more categories, e.g., non-defective/to-be-remachined/to-be-discarded or A/B/C/D. The input device 50 may be a keyboard, pointing device, control panel or other input device through which the worker inputs the result of sorting of the objects to be sorted. Moreover, the input device 50 may be a device configured to automatically detect that the objects to be sorted are sorted by the worker into predetermined categories provided in advance.

If the input device 50 is the device automatically detecting the sorting result of the objects to be sorted, it may be configured to detect identification information for each category, such as tags or marks attached to the objects to be sorted by the worker, or detect sorting into divided areas in each category. The input device 50 delivers the sorting result data through an interface 17 to the CPU 11.

The measuring device 60 is a device acquiring the measurement data indicative of physical quantities, such as shapes, colors and weights, used to sort the objects. For example, the measuring device 60 may be an imaging device configured to image external appearances of the objects to be sorted, or a sensor configured to measure physical quantities, such as the weights, strengths and temperatures of the objects to be sorted, or a device for measuring components or factors, such as sugar contents, degrees of maturity, degrees of acidity, lycopene, fat, amino acids, other proteins, starch contents and glucose contents. Moreover, the measuring device 60 may be a combination of the above-mentioned imaging device and a plurality of various sensors, which can measure weights while imaging, for example. The measuring device 60 delivers the measured measurement data through an interface 18 to the CPU 11.

A control circuit 19 receives a command from the CPU 11 and controls the sorting operation of the sorting device 70. The control of the sorting operation of the sorting device 70 by the control circuit 19 varies depending on the type of the sorting device 70. For example, if the sorting device 70 is a device configured to only output the result of sorting, the control circuit 19 controls the sorting operation according to the command from the CPU 11 so as to notify the sorting result by a display screen, light, sound and so on. If the sorting device 70 is a device configured to sort the objects to be sorted on the conveyor at the junction, the control circuit 19 controls the destination of the objects at the junction according to the command from the CPU 11. If the sorting device 70 is a robot that holds and then sorts the objects to be sorted, the control circuit 19 controls the transportation of the objects by the robot according to the command from the CPU 11.

Furthermore, the control circuit 19 performs control for switching between sorting work by the worker and automatic sorting operation by the sorting device 70. The contents of the control for switching between the sorting work by the worker and the sorting operation by the sorting device 70 vary depending on the type of the sorting device 70. For example, if the sorting device 70 is the device configured to sort the objects to be sorted on the conveyor at the junction, the control can be performed so that the automatic sorting operation at the junction is disabled after the running speed of the conveyor is reduced during the sorting work by the worker. On the contrary, during the automatic sorting operation by the sorting device 70, the automatic sorting operation at the junction can be controlled by increasing the conveyor speed.

An interface 21 is an interface connecting the control device 2 with the machine learning device 100. The machine learning device 100 comprises a processor 101 controlling the entire machine learning device 100, a ROM 102 stored with system programs and the like, a RAM 103 for temporary storage in each step of processing related to machine learning and a non-volatile memory 104 used to store a learning model and the like. The machine learning device 100 can observe various pieces of information (sorting result data on the objects to be sorted input through the input device 50, measurement data measured by the measuring device 60, etc.) that can be acquired by the control device 2 through the interface 21. Moreover, the control device 2 delivers a command for controlling the sorting of the objects to be sorted by the sorting device 70, which command is output from the machine learning device 100, to the CPU 11.

Figure 2:
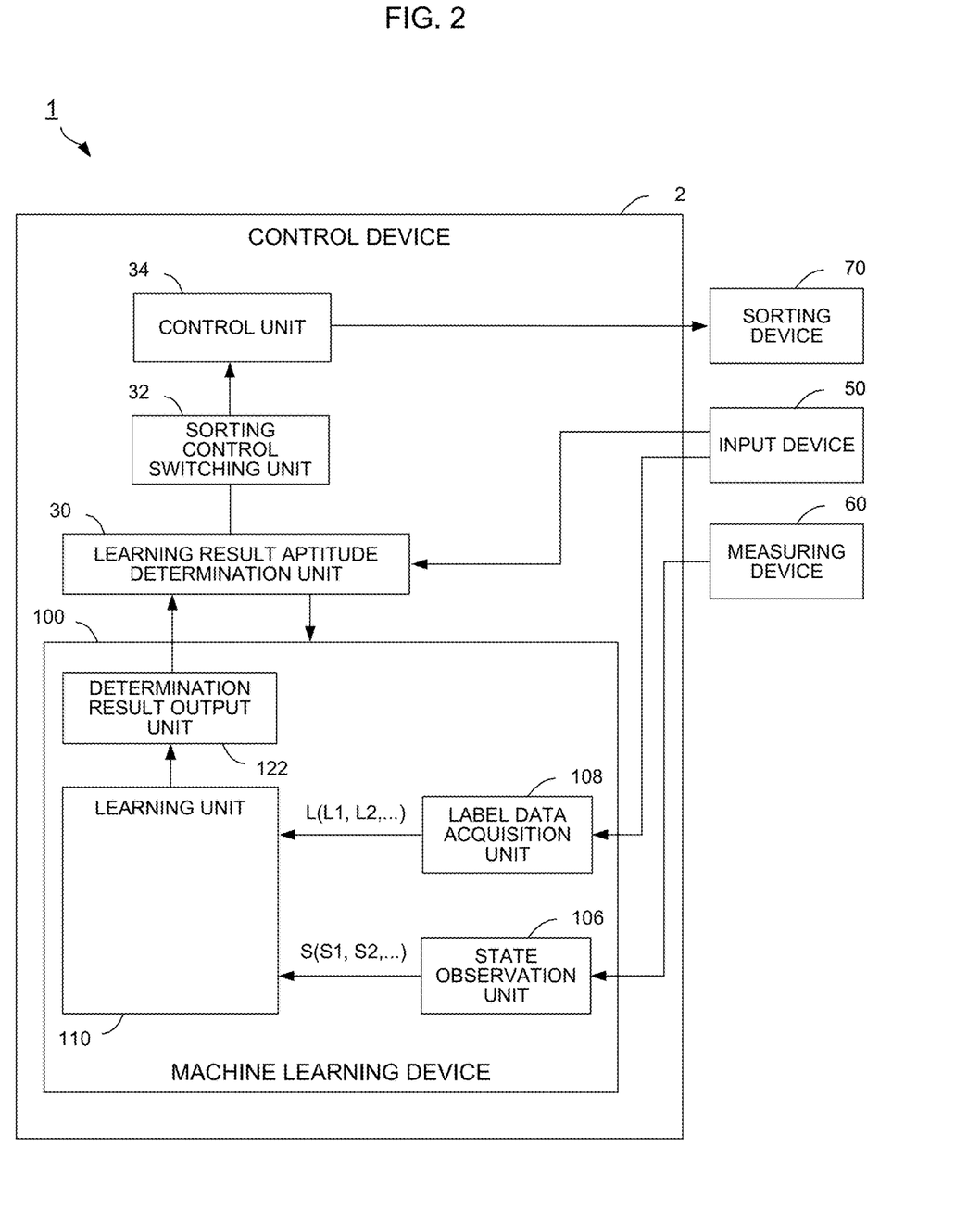
FIG. 2 is a schematic functional block diagram of the sorting system according to the one embodiment.

FIG. 2 is a schematic functional block diagram showing principal parts of a sorting system according to one embodiment of the present invention. Functional blocks shown in FIG. 2 are implemented so that the CPU 11 in the control device 2 shown in FIG. 1 and the processor 101 in the machine learning device 100 perform their respective system programs, thereby controlling the operations of the various parts of the control device 2 and the machine learning device 100. The control device 2 that constitutes the sorting system 1 of the present embodiment comprises a learning result aptitude determination unit 30, a sorting control switching unit 32, and a control unit 34.

The learning result aptitude determination unit 30 is a functional instrument configured to determine the aptitude of the result of learning by the machine learning device 100, based on the result of comparison between the result of sorting of the objects to be sorted input through the input device 50 and the result of sorting determined for the objects to be sorted by the machine learning device 100, and output the result of the determination to the sorting control switching unit 32. The learning result aptitude determination unit 30 performs statistical processing based on the result of sorting of the objects to be sorted input through the input device 50 related to the objects to be sorted and the sorting result determined for the objects to be sorted by the machine learning device 100. If the result of the statistical processing is not lower than a predetermined first criterion, the learning result aptitude determination unit 30 determines that the aptitude of the result of learning of the machine learning device 100 is compatible with a previously specified criterion. If the result is different, it is determined that the aptitude of the result of learning of the machine learning device 100 is not compatible with the previously specified criterion. A message according to the above determination may be further output to the sorting control switching unit 32. For this predetermined criterion, for example, the number of times the two sorting results are continuously coincident may be expected to be not lower than a predetermined first frequency. The concordance rate of the two sorting results on a predetermined number of past objects to be sorted may be expected to be higher than a predetermined first rate. Alternatively, some other statistical method may be used as the predetermined criterion.

The learning result aptitude determination unit 30 may be configured, for example, to continue to directly output the determination that the aptitude of the learning result of the machine learning device 100 is compatible with the previously specified criterion after it is once determined that the aptitude of the learning result of the machine learning device 100 has become compatible with the previously specified criterion. Moreover, the learning result aptitude determination unit 30 may be configured, for example, to perform similar aptitude determination in a sampling manner at any timing desired by the worker even after it is once determined that the aptitude of the learning result of the machine learning device 100 has become compatible. Furthermore, the learning result aptitude determination unit 30 may be configured to output determination that the aptitude of the learning result of the machine learning device 100 has ceased to be compatible with the previously specified criterion if a predetermined second criterion (e.g., criterion indicative of a level lower than the first criterion) is not reached.

The learning result aptitude determination unit 30 may be configured, for example, to command the machine learning device 100 to stop the machine learning if the result of the aptitude determination on the learning result is not lower than a predetermined third criterion (e.g., criterion indicative of a level not lower than the first criterion) after it is determined that the aptitude of the learning result of the machine learning device 100 is compatible with the previously specified criterion. The learning result aptitude determination unit 30 may be configured to command the machine learning device 100 to restart the machine learning if the result of the aptitude determination on the learning result performed in a sampling manner at any timing desired by the worker has fallen below a predetermined fourth criterion (e.g., criterion indicative of a level lower than the third criterion) thereafter.

Moreover, the learning result aptitude determination unit 30 may be configured, for example, to command the machine learning device 100 to discard the learning results obtained so far and start over the learning anew if the result of the aptitude determination on the learning result of the machine learning device 100 is not higher than a predetermined fifth criterion (e.g., criterion indicative of a level not lower than the first criterion).

The sorting control switching unit 32 is a functional instrument configured to switch the mode of sorting of the objects to be sorted between automatic sorting by the sorting device 70 and manual sorting by the worker, based on the aptitude determination on the learning result of the machine learning in the machine learning device 100 output from the learning result aptitude determination unit 30. The sorting control switching unit 32 commands the control unit 34 not to perform the automatic sorting of the objects to be sorted by the sorting device 70 if it is determined that the aptitude of the learning result of the machine learning in the machine learning device 100 is not compatible with the previously specified criterion. In contrast, the sorting control switching unit 32 commands the control unit 34 to perform the automatic sorting of the objects to be sorted by the sorting device 70 if it is determined that the aptitude of the learning result of the machine learning in the machine learning device 100 output from the learning result aptitude determination unit 30 is compatible with the previously specified criterion.

The sorting control switching unit 32 may be configured to notify the worker of the accomplishment of the switching using a display device (not shown), light on a control panel, or audio output, in switching the automatic or manual mode of sorting of the objects to be sorted.

The aptitude determination on the learning result by the learning result aptitude determination unit 30 and the switching of the automatic sorting by the sorting control switching unit 32 described above can be organized as follows.

Excellent aptitude (not lower than the third criterion): The automatic sorting is (thereafter) performed. However, the learning in the machine learning device is not performed (e.g., in the case the sorting is accomplished with sufficient accuracy).

Good aptitude (not lower than the first criterion): The automatic sorting is (thereafter) performed. The learning in the machine learning device is subsequently performed (to aim for excellent aptitude).

Pending aptitude (state at the time of system start-up): The automatic sorting is not performed (thereafter). The learning in the machine learning device is performed (to aim for good aptitude).

Bad aptitude (not higher than the fifth criterion): The automatic sorting is not performed (thereafter). The learning in the machine learning device is performed (the existing learning results are discarded and relearning is started anew, in the case where the results of sorting using the learning results are irrelevant, for example).

The control unit 34 is a functional instrument configured to control the sorting device 70 and generate control information for the automatic sorting of the objects to be sorted if the sorting of the objects to be sorted is commanded by the sorting control switching unit 32. While the control of the sorting operation of the sorting device 70 by the control unit 34 varies depending on the type of the sorting device 70, output control of the sorting result, branch control at the junction of the conveyor, transportation control by the robot and the like are exemplified as described above.

On the contrary, the machine learning device 100 that constitutes the sorting system 1 of the present embodiment comprises a state observation unit 106 and a label data acquisition unit 108. The state observation unit 106 observes state variables S representative of the present states of the environments and including measurement data S1 indicative of information on the states of the objects to be sorted measured by the measuring device 60. The label data acquisition unit 108 acquires label data L including sorting result data L1 indicative of the result of sorting of the objects to be sorted input through the input device 50. The machine learning device 100 further comprises a learning unit 110 configured to learn the sorting result data L1 in association with the states of the objects to be sorted using the state variables S and the label data L and a determination result output unit 122 configured to output the result of determination using a present pre-trained model, based on the states of the objects to be sorted.

Among the state variables S observed by the state observation unit 106 in the machine learning device 100, the measurement data S1 can be acquired as a set of pieces of information related to the states of the objects to be sorted measured by the measuring device 60. The pieces of information related to the states of the objects to be sorted measured by the measuring device 60 include, for example, shapes, colors and flaws acquired from images indicative of the external appearances of the objects to be sorted, weights and rigidities of the objects to be sorted, damage or decomposition, and adhesion of refuse or foreign matter, such as soil, stems and leaves. However, any other values may be acquired as the pieces of information related to the states of the objects to be sorted, provided they serve as evaluation criteria for the sorting of the objects to be sorted.

The label data acquisition unit 108 can use the sorting result data L1, indicative of the result of sorting of the objects to be sorted input through the input device 50, as the label data L. Possible values for the sorting result data L1 vary depending on the purpose of sorting. In dividing non-defective and defective products, for example, two values can be taken, a label indicative of a non-defective product and a label indicative of a defective product. In classifying products into three or more categories, label values (multiple values) indicative of the individual categories can be taken. The sorting result data L1 is an index representative of the result of determination by the worker with respect to the state variables S obtained from the objects to be sorted.

The learning unit 110 learns the label data L (sorting result data L1 indicative of the result of sorting of the objects to be sorted) relative to the state variables S (measurement data S1 indicative of the information on the states of the objects to be sorted) according to an arbitrary learning algorithm collectively called the machine learning. The learning unit 110 can learn the correlation between, for example, image-pickup data (images) obtained by imaging the objects to be sorted, the state of which is included in the state variables S, and the result of sorting of the objects to be sorted included in the label data L.

The learning unit 110 can repeatedly perform the learning based on the above data set including the state variables S and the label data L. The learning unit 110 can automatically identify characteristics suggestive of the correlation between the information (measurement data S1) on the states of the objects to be sorted and the result of sorting (sorting result data L1) of the objects to be sorted by repeating a learning cycle. Although the correlation between the measurement data S1 and the sorting result data L1 is practically undetermined at the start of the learning algorithm, the learning unit 110 interprets the correlation by gradually identifying the characteristics with the progress of the learning. If the correlation between the measurement data S1 and the sorting result data L1 is interpreted to some reliable level, the learning results repeatedly output by the learning unit 110 can be used to determine how to sort the objects to be sorted based on the present states (i.e., states of the objects to be sorted). Thus, the learning unit 110 can gradually approximate the correlation between the states of the objects to be sorted and the determination of the sorting of the objects to be sorted to an optimal solution with the progress of the learning algorithm. The learning unit 110 may be configured to stop the execution of the machine learning when the machine learning device 100 is commanded to stop the learning by the learning result aptitude determination unit 30.

The determination result output unit 122 performs the determination of the sorting of the objects to be sorted relative to their states, based on the result of the learning by the learning unit 110, and outputs the result of the determination to learning result aptitude determination unit 30. Possible values for the result of the determination of the sorting of the objects to be sorted output from the determination result output unit 122 vary depending on the purpose of sorting. In dividing non-defective and defective products, for example, two values can be output, a label indicative of a non-defective product and a label indicative of a defective product. In classifying products into three or more categories, label values (multiple values) indicative of the individual categories can be output. The result of the determination by the determination result output unit 122 may be output to, for example, a display device (not shown) for the sorting device 70 or a display device (not shown) for the control device 2 without regard to the aptitude determination on the learning result by the learning result aptitude determination unit 30. In doing this, however, the display is preferably made distinctively from the display related to the automatic sorting by the control unit 34.

As a modification of the machine learning device 100 in the sorting system 1, the state observation unit 106 may be configured to observe sorting-related information S2 indicative of supplementary information on sorting, in addition to the measurement data S1. For example, the sorting-related information S2 may be a value indicative of an image area part that serves as the basis of sorting in the case where the measurement data S1 is image-pickup data.

Alternatively, the sorting-related information S2 may be a value indicative of the temperature of an external environment, such as the platform or the outdoor air, in the case where the measurement data S1 is temperature data. The sorting-related information S2 may be expected to be obtained by analyzing the measurement data measured by the measuring device 60 or manually input through the input device 50.

According to the above modification, the machine learning device 100 can learn the correlation of the sorting result data L1 with the measurement data S1 and the sorting-related information S2 indicative of the supplementary information on sorting, so that a higher-accuracy sorting determination result can be output.

Figure 3:
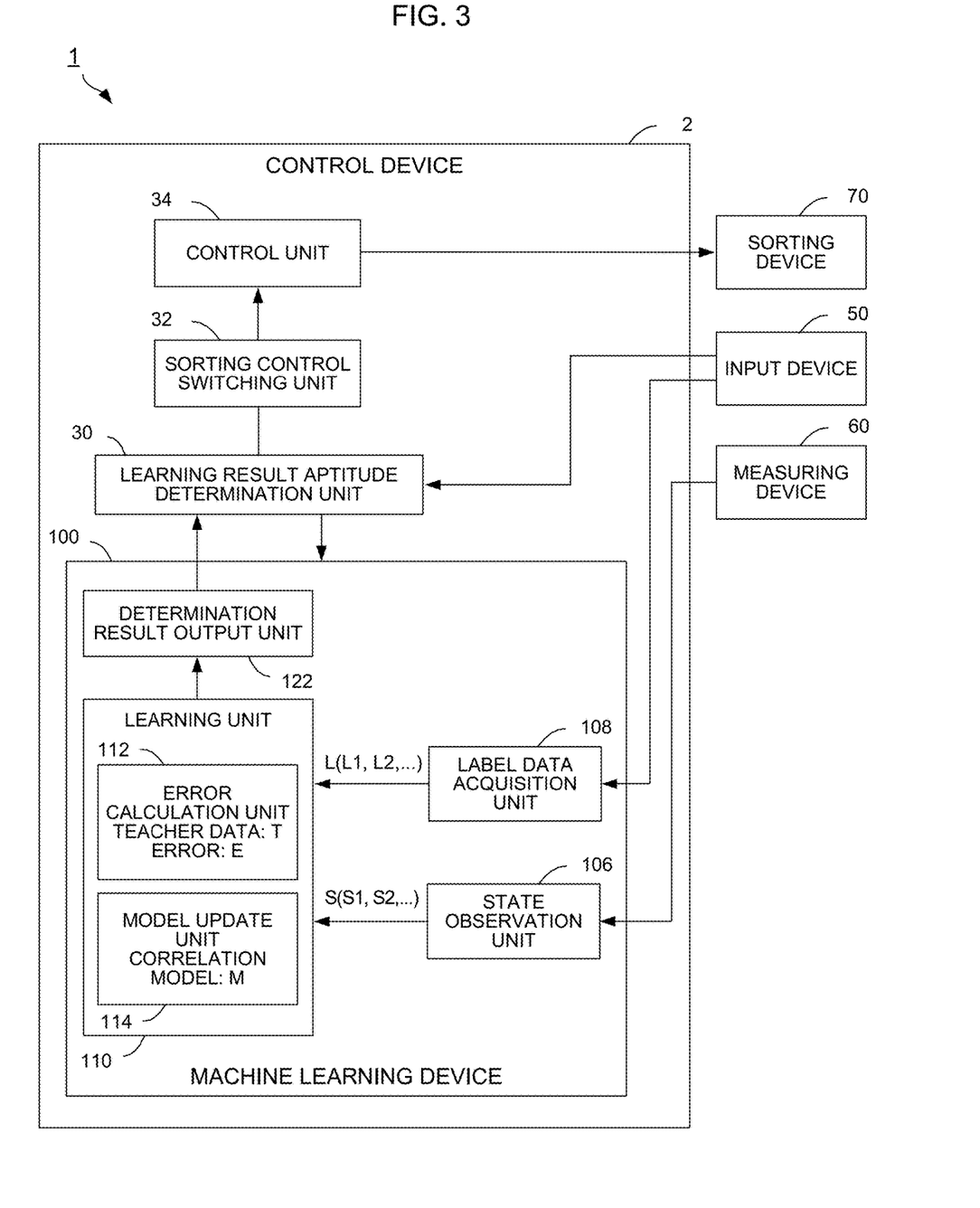
FIG. 3 is a schematic functional block diagram showing a configuration of the sorting system.

In the machine learning device 100 having the above structure, the learning algorithm performed by the learning unit 110 is not particularly limited and a conventional learning algorithm can be used as the machine learning. FIG. 3 shows a structure based on another embodiment of the sorting system 1 shown in FIG. 2, in which the learning unit 110 performs supervised learning as another example of the learning algorithm. The supervised learning is a method in which known data sets (called teacher data) including inputs and outputs corresponding thereto are given, and characteristics suggestive of the correlations between the inputs and the outputs are identified by these teacher data, whereby a correlation model for estimating an output required for a new input is learned.

In the machine learning device 100 of the sorting system 1 shown in FIG. 3, the learning unit 110 comprises an error calculation unit 112 and a model update unit 114. The error calculation unit 112 calculates errors E between a correlation model M that determines the sorting of the objects to be sorted by their states based on the state variables S and a correlation characteristic identified by teacher data T obtained from the result of the worker's sorting of the objects to be sorted. The model update unit 114 updates the correlation model M so as to reduce the error E. The learning unit 110 learns the determination of the sorting of the objects to be sorted relative to their states by making the model update unit 114 repeat the update of the correlation model M.

An initial value of the correlation model M is given, for example, as a simplified representation (e.g., linear function) of the correlations between the state variables S and the result of sorting of the objects to be sorted, to the learning unit 110 before the start of the supervised learning. In the present invention, the teacher data T can be composed of experience values obtained from the result of the worker's sorting of the objects to be sorted, and are given to the learning unit 110 as required at an early stage of operation. The error calculation unit 112 identifies the correlation characteristics suggestive of the correlation between the states of the objects to be sorted and the result of their sorting from the teacher data T given to the learning unit 110 as required. Then, the error calculation unit 112 obtains the errors E between the correlation characteristics and the correlation model M corresponding to the state variables S in the present states and label data L. The model update unit 114 updates the correlation model M so as to reduce the errors E according to a predetermined update rule, for example.

In the next learning cycle, the error calculation unit 112 determines the sorting of the objects to be sorted, using the state variables S according to the updated correlation model M, and obtains the errors E between the result of this determination and the actually obtained label data L. Then, the model update unit 114 updates the correlation model M again. In this way, the correlation between the present state of the environment having so far been unknown and prediction thereof gradually becomes clear.

A neural network can be used to advance the above supervised learning.

Figure 4A:
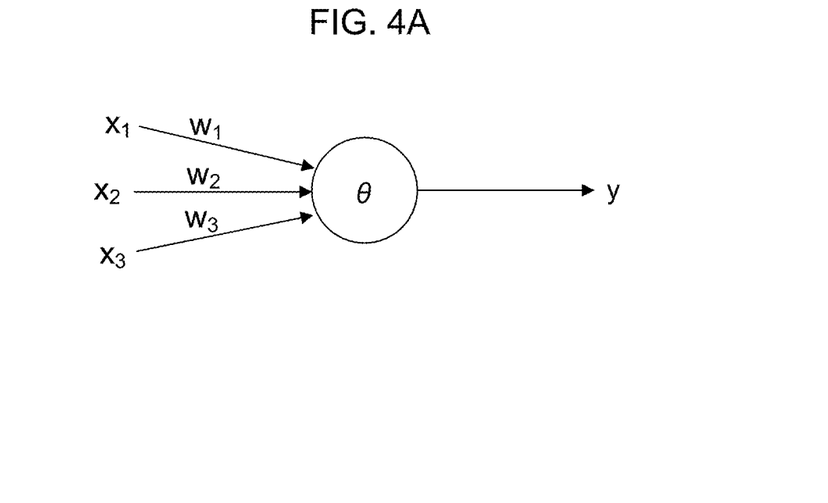
FIG. 4A is a diagram illustrating a neuron.
Figure 4B:
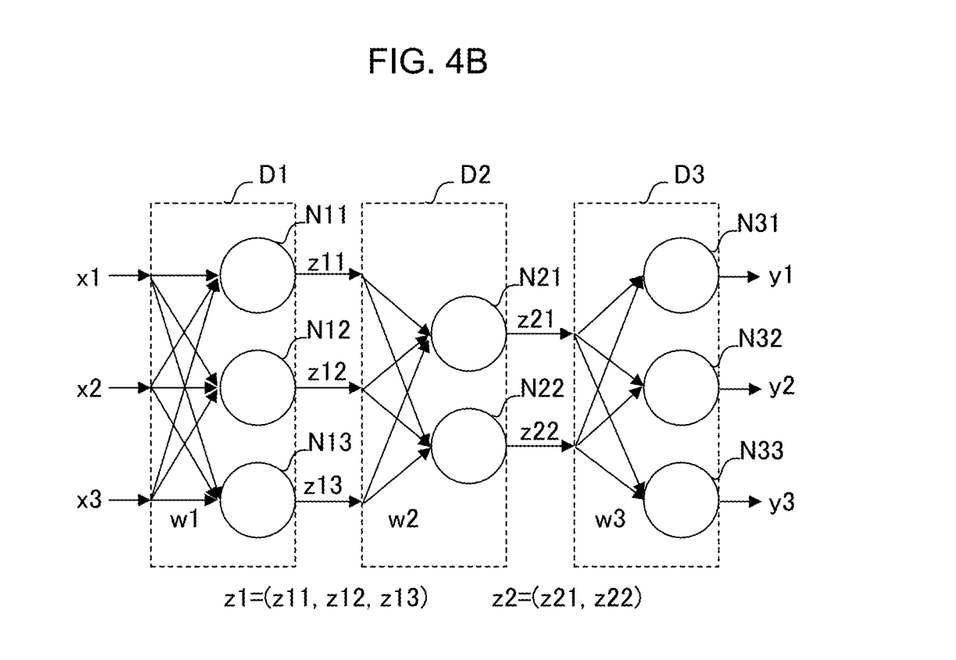
FIG. 4B is a diagram illustrating a neural network.

FIG. 4A schematically shows a model of a neuron. FIG. 4B schematically shows a model of a three-layer neural network constructed by combining the neurons shown in FIG. 4A. The neural network can be composed of, for example, an arithmetic unit or a storage device imitating the neuron model.

The neuron shown in FIG. 4A outputs results y from a plurality of inputs x (e.g., inputs $x_1$ to $x_3$). The inputs $x_1$ to $x_3$ are multiplied by their corresponding weights w ($w_1$ to $w_3$). Thus, the neuron delivers the outputs y represented by the following Formula. The inputs x, outputs y and weights w are all vectors. The letter θ indicates a bias. Moreover, $f_k$ indicates an activation function.

$$y = f_k(\Sigma_{i=1}^{n} x_i w_i - \theta)$$

In the three-layer neural network shown in FIG. 4B, a plurality of inputs x (e.g., inputs x1 to x3) are input from the left side and results y (e.g., results y1 to y3) are output from the right side. In the illustrated example, the individual inputs x1, x2 and x3 are multiplied by their corresponding weights (collectively represented by w1) and each of them is input to three neurons N11, N12 and N13.

In FIG. 4B, the respective outputs of the neurons N11 to N13 are collectively represented by z1. The outputs z1 can be regarded as feature vectors based on the extraction of the feature quantity of input vectors. In the illustrated example, the individual feature vectors z1 are multiplied by their corresponding weights (collectively represented by w2) and each of them is input to two neurons N21 and N22. The feature vectors z1 represent features between the weights w1 and w2.

In FIG. 4B, the respective outputs of the neurons N21 and N22 are collectively represented by z2. The outputs z2 can be regarded as feature vectors based on the extraction of the feature quantity of the feature vectors z1. In the illustrated example, the individual feature vectors z2 are multiplied by their corresponding weights (collectively represented by w3) and each of them is input to three neurons N31, N32 and N33. The feature vectors z2 represent features between the weights w2 and w3. Finally, the neurons N31 to N33 output the results y1 to y3, respectively.

The so-called deep learning method can be used based on a neural network of three or more layers.

In the machine learning device 100 in the sorting system 1, the determination of sorting (results y) for the states of the objects to be sorted can be output by making the learning unit 110 perform a calculation of a multi-layer structure based on the above neural network with the state variables S used as the inputs x. Operation modes of the neural network include a learning mode and a value prediction mode. For example, the weights w can be learned using a learning data set in the learning mode, while the value of a behavior can be determined in the value prediction mode using the learned weights w. Detection, classification, inference and the like can also be performed in the value prediction mode.

The above structure of the machine learning device 100 can be described as a machine learning method (or software) performed by the processor 101. This machine learning method is a method for learning the determination of the sorting of the objects to be sorted relative to their states and comprises a step in which the processor 101 observes the measurement data S1 indicative of information on the states of the objects to be sorted as the state variables S representative of the present states, a step of acquiring the sorting result data L1 indicative of the results of sorting of the objects to be sorted as the label data L, and a step of learning the measurement data S1 and the results of sorting of the objects to be sorted in association with one another using the state variables S and the label data L.

A pre-trained model obtained by learning by the learning unit 110 in the machine learning device 100 can be used as a program module, which is a part of software related to the machine learning. The pre-trained model according to the present invention can be used in a computer provided with a processor, such as a CPU and a GPU (Graphics Processing Unit), and a memory. More specifically, the processor in the computer operates so as to perform calculation with the states of the objects to be sorted as inputs, according to a command from the pre-trained model stored in the memory, and to output the sorting result of the objects to be sorted relative to their states based on the result of the calculation. The pre-trained model according to the present invention can be copied and used for other computers through external storage media, networks or the like.

Moreover, when the pre-trained model according to the present invention is copied and used for other computers in a new environment, it can also be made to perform further learning based on new state variables and determination data obtained in this environment. If this further learning is learned, the pre-trained model (hereinafter referred to as the derived model) derived from the pre-trained model due to the environment can be obtained. While the derived model of the present invention resembles the original pre-trained model in that it outputs the determination result of the sorting of the objects to be sorted relative to their predetermined states, it is different from the original pre-trained model in that it outputs a result compatible with a newer environment (newer objects to be sorted). This derived model can also be copied and used for other computers through the external storage media, networks or the like.

Furthermore, it is also possible to create and use a pre-trained model (hereinafter referred to as the distillation model) obtained by starting learning in another machine learning device from scratch, using an output (value) obtained for an input (determination of sorting in the predetermined states of the objects to be sorted) to the machine learning device incorporated with the pre-trained model of the present invention (this learning process is called as distillation). In connection with the distillation, the original pre-trained model and the newly created distillation model are also called as a teacher model and a student model, respectively. In general, the distillation model is smaller than the original pre-trained model in size and yet can provide accuracy equivalent to that of the original pre-trained model, so that it is more suitable for distribution for computers through the external storage media, networks or the like.

Figure 5:
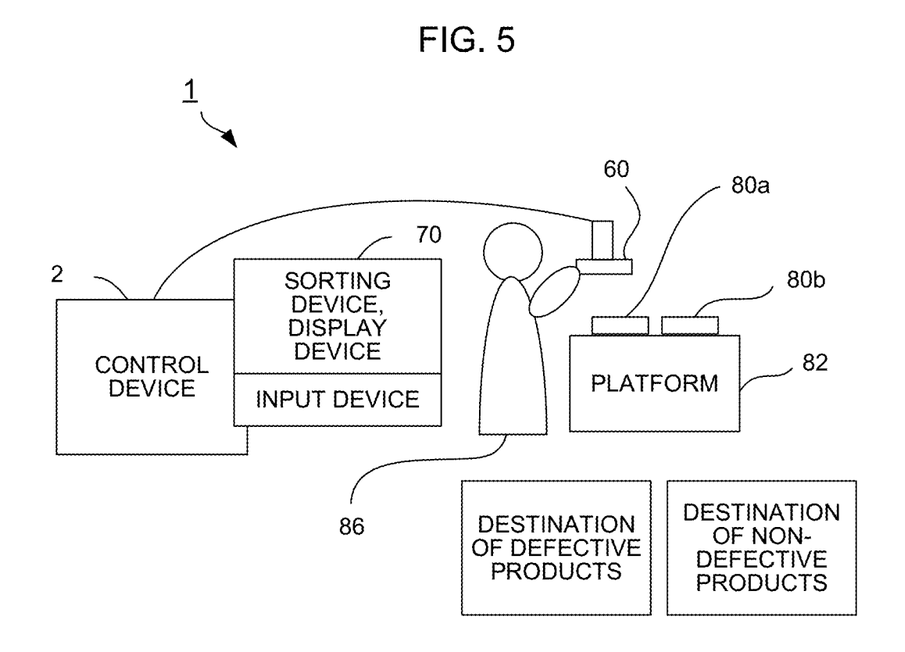
FIG. 5 is a diagram showing an operation example of the sorting system.

FIG. 5 shows an embodiment in which the objects 80 to be sorted, placed on a platform 82, are imaged by using a visual sensor as the measuring device 60 and the result of determination on whether each of the objects 80 is a non-defective product 80a or a defective product 80b is displayed on the display device as the sorting device 70. In the initial stage of the sorting work, the worker 86 images the objects 80 using the measuring device 60 and further inputs the result that the objects 80 are sorted into the non-defective products 80a and defective products 80b, by means of the input device 50. The machine learning device 100 in the control device 2 performs the machine learning based on the image-pickup data (measurement data S1) captured by the measuring device 60 and the result of sorting (sorting result data L1) of the objects 80 input through the input device 50. When the accuracy of the learning is increased, a message to the effect that the sorting will thereafter be performed automatically is displayed on the sorting device 70. Thereafter, the sorting device 70 can display the sorting result as to whether or not each of the objects 80 is a non-defective product 80a or defective product 80b, when the worker 86 only measures the objects 80 using the measuring device 60.

In the embodiment shown in FIG. 5, the visual sensor as the measuring device 60 may be installed on a moving part, such as a hand of the robot. Alternatively, the robot hand or other moving part may be used to hold and handle each object 80 to be sorted. Moreover, a plurality of objects 80 may be simultaneously arranged and imaged. In this case, the worker should only provide interfaces through which the results of sorting are input individually for the objects 80, and the control device 2 should separately analyze each individual object 80 from a captured image and output the sorting result determined for each object 80. Furthermore, the input image obtained by the visual sensor as the measuring device 60 may be a two-dimensional color image, two-dimensional grayscale image, distance image, three-dimensional point group or video thereof.

Figure 6:
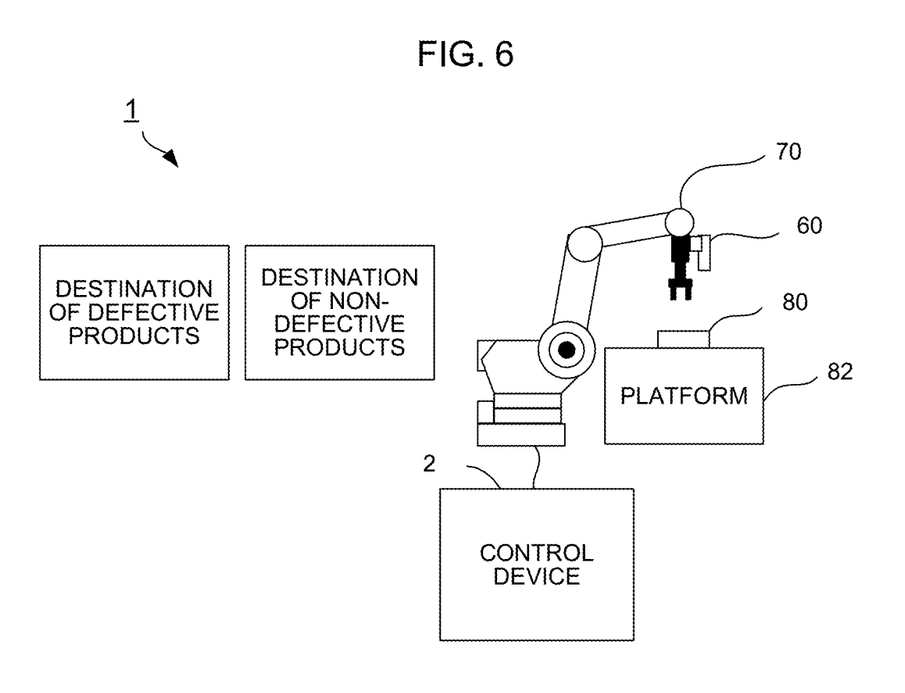
FIG. 6 is a diagram showing another operation example of the sorting system.

Moreover, after the aptitude of the learning result is determined to be compatible with the previously specified criterion in the sorting system 1 illustrated in FIG. 5, the robot as the sorting device 70 may be connected to the control device 2 so that the sorting device 70 (robot) can perform automatic sorting under the control of the control device 2, as shown in FIG. 6.

While the embodiment of the present invention has been described above, the invention is not limited to the above-described embodiment and may be suitably modified and embodied in various aspects.

For example, the learning algorithm performed by the machine learning device 100, calculation algorithm performed by the machine learning device 100, control algorithm performed by the control device 2 and the like are not limited to those described above. Various other algorithms can be also used for this purpose.

Moreover, in connection with the above embodiment, the control device 2 and the machine learning device 100 are described as having different CPUs (processors). Alternatively, however, the machine learning device 100 may be implemented based on the CPU 11 in the control device 2 and the system programs stored in the ROM 12.

Furthermore, in connection with the above embodiment, the machine learning device 100 is illustrated as being disposed on the control device 2. Alternatively, however, the machine learning device 100 can be configured to reside in a cloud server or the like provided in a network. Moreover, the present invention can also be implemented by providing a self-controller or a host controller with the functions of the learning result aptitude determination unit 30 and the sorting control switching unit 32 in the control device 2 and disposing the control unit 34 on the sorting device 70 or a control device for controlling the sorting device 70.

The invention claimed is:

1. A sorting system configured to generate control information for sorting an object to be sorted, based on measurement data obtained by measuring a state of the object to be sorted with a measuring device, the sorting system comprising:
an input device configured to receive sorting data indicative of a first result of sorting of the object to be sorted by a worker;
a machine learning device configured to learn the sorting data corresponding to the measurement data to determine a second result of sorting of the object to be sorted;
a learning result aptitude determination unit configured to determine an aptitude of a result of learning by the machine learning device, based on the first result input through the input device and the second result determined by the machine learning device;
a sorting control switching unit configured to switch a mode of sorting operation for the object to be sorted, based on the aptitude determined by the learning result aptitude determination unit; and
a control unit configured to generate the control information for sorting the object to be sorted,
wherein
the sorting control switching unit is configured to switch the mode of sorting operation of the control unit so as to perform automatic sorting of the object to be sorted, in response to the aptitude of the result of the learning being compatible with a previously specified criterion, and
the sorting control switching unit is configured to switch the mode of sorting operation of the control unit so as not to perform the automatic sorting of the object to be sorted, in response to the aptitude of the result of the learning being not compatible with the previously specified criterion.

2. The sorting system according to claim 1, wherein the learning result aptitude determination unit is configured to determine that the aptitude of the result of learning is compatible with the previously specified criterion, in response to a result of statistical processing based on the first result input through the input device and the second result determined by the machine learning device being not lower than a predetermined first criterion.

3. The sorting system according to claim 1, wherein the learning result aptitude determination unit is configured to command the machine learning device to stop the learning, in response to a result of statistical processing based on the first result input through the input device and the second result determined by the machine learning device being not lower than a predetermined third criterion.

4. The sorting system according to claim 1, wherein the learning result aptitude determination unit is configured to command the machine learning device to discard the second result obtained so far and start over the learning anew, in response to a result of statistical processing based on the first result input through the input device and the second result determined by the machine learning device being not higher than a predetermined fifth criterion.

5. The sorting system according to claim 1, wherein
the machine learning device is configured to further observe sorting-related information supplementing the sorting of the object to be sorted in addition to the measurement data, and
the machine learning device is configured to learn the sorting data corresponding to both the measurement data and the sorting-related information.

* * * * *